United States Patent
Shenk (10) Patent No.: US 11,734,498 B1
(45) Date of Patent: Aug. 22, 2023

(54) WYSIWYG EDITOR CONFIGURED FOR USE OF EXTERNAL RENDERING ENGINE

(71) Applicant: Intuit Inc., Mountain View, CA (US)

(72) Inventor: Eric Shenk, Phoenix, AZ (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/877,473

(22) Filed: Jul. 29, 2022

(51) Int. Cl.
```
G06F 40/00      (2020.01)
G06F 40/143     (2020.01)
G06F 40/166     (2020.01)
G06F 40/106     (2020.01)
G06F 3/04842    (2022.01)
```

(52) U.S. Cl.
CPC .......... G06F 40/143 (2020.01); G06F 40/106 (2020.01); G06F 40/166 (2020.01); *G06F 3/04842* (2013.01)

(58) Field of Classification Search
CPC .... G06F 40/143; G06F 40/166; G06F 40/106; G06F 3/04842
See application file for complete search history.

(56) References Cited

U.S. PATENT DOCUMENTS

| | | | | |
|---|---|---|---|---|
| 7,281,018 B1* | 10/2007 | Begun | ............... | G06F 40/143 707/999.102 |
| 8,464,148 B1* | 6/2013 | Wichary | ............... | G06F 16/958 717/113 |
| 8,578,264 B2* | 11/2013 | Chen | ............... | G06F 40/117 715/236 |
| 2005/0039108 A1* | 2/2005 | Hudson | ............... | G06F 40/166 715/234 |
| 2008/0155397 A1* | 6/2008 | Bissonnette | ............... | G06F 40/106 715/255 |
| 2012/0151329 A1* | 6/2012 | Cordasco | ............... | G06F 16/958 715/234 |
| 2014/0304682 A1* | 10/2014 | Taylor | ............... | G06F 3/048 717/113 |
| 2016/0062963 A1* | 3/2016 | Umapathy | ............... | G06F 40/166 715/760 |
| 2018/0181556 A1* | 6/2018 | Chang | ............... | G06F 3/0483 |
| 2021/0011899 A1* | 1/2021 | Olivier | ............... | G06F 40/166 |

* cited by examiner

*Primary Examiner* — Scott T Baderman
*Assistant Examiner* — Barbara M Level
(74) *Attorney, Agent, or Firm* — Paradice & Li LLP (57) ABSTRACT

Systems and methods of editing a user experience by a what you see is what you get (wysiwyg) editor are disclosed. A system obtains a visible portion of a document object model for a document, with the visible portion including one or more visible objects to be presented to a user during a user experience. Instead of the visible portion being generated by the wysiwyg editor (thus requiring the visible portion to be rendered again at a later time by a rendering engine), the visible portion to be used is generated by the rendering engine based on a schema of the document. To allow such, the system generates and outputs an overlay to be placed on the visible portion during display of the visible portion, with the overlay to receive user inputs to the visible portion and thus prevent user interaction with the visible portion.

8 Claims, 5 Drawing Sheets

WYSIWYG EDITOR CONFIGURED FOR USE OF EXTERNAL RENDERING ENGINE

TECHNICAL FIELD

This disclosure relates generally to the use of a wysiwyg editor, including the wysiwyg editor being configured for use in combination with an external rendering engine.

DESCRIPTION OF RELATED ART

To generate a user experience (UX) for a graphical user interface (GUI), a model of a flow of desired user interaction is generated (as a schema). Based on the schema, various windows, buttons, menus, and other visible objects are generated for display. For example, a website is designed to include a specific mapping of interactions with the website, and the website is to include a plurality of visible objects to be displayed and/or interacted with by a user. Typically, a computer readable code editor (such as some hypertext markup language (HTML) or extended markup language (XML) editors, or other types of editing software) includes a sandbox in which a visible portion of the UX is generated by the editor for testing by a programmer or developer. In testing and updating the visible portion in the sandbox, the schema is updated by the editor into a final form for a rendering engine. The rendering engine thus builds the final visible portion and other objects of the UX based on the final schema.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for editing a user experience (UX) by a what you see is what you get (wysiwyg) editor. The method includes obtaining a visible portion of a document object model (DOM) for a document. The visible portion is generated by a rendering engine based on a schema of the document, and the visible portion includes one or more visible objects to be presented to a user during a UX. The method also includes outputting the visible portion of the DOM for display in a graphical user interface (GUI) for the wysiwyg editor, generating an overlay to be placed on the visible portion during display, and outputting the overlay for display in the GUI. The overlay is to receive user inputs via the GUI to the visible portion and prevent user interaction via the GUI with the visible portion.

Another innovative aspect of the subject matter described in this disclosure can be implemented in a system for editing a UX by a wysiwyg editor. An example system includes one or more processors and a memory storing instructions that, when executed by the one or more processors, cause the system to perform operations. The operations include obtaining a visible portion of a DOM for a document. The visible portion is generated by a rendering engine based on a schema of the document, and the visible portion includes one or more visible objects to be presented to a user during a UX. The method also includes outputting the visible portion of the DOM for display in a GUI for the wysiwyg editor, generating an overlay to be placed on the visible portion during display, and outputting the overlay for display in the GUI. The overlay is to receive user inputs via the GUI to the visible portion and prevent user interaction via the GUI with the visible portion.

In this manner, instead of the editor itself generating a copy of the visible portion for testing and editing of a schema, which would then require a rendering engine to again generate the visible portion that is to be used, a visible portion generated by the rendering engine may be used for testing and editing the schema. To be able to do use a visible portion from the rendering engine for editing a schema, the overlay generated by the editor is used to intercept user inputs to areas of a display displaying the visible portion to prevent interaction with the visible portion. In this manner, the user input may be used to edit the schema by the editor instead of interacting with the visible portion itself from the rendering engine. For the editor to be able to edit the schema based on the user inputs, the editor may link portions of the visible object to portions of its overlay and to portions of a structure of the schema as built by the editor.

In some implementations, the system is further configured to generate, from the schema, a tree structure of a plurality of objects associated with the visible portion. For each visible object of the one or more visible objects of the visible portion, the system may link an object of the tree structure to the visible object of the visible portion. The system may also output the tree structure for display in the GUI, with the tree structure to be displayed concurrently with the visible portion. In generating the outlay, the system may identify locations of the visible objects of the visible portion in the GUI in a sequential manner based on the tree structure and generate regions of the overlay associated with the visible objects and coinciding with the locations of the visible objects. As such, to edit the schema, the system may receive one or more user interactions via the GUI to the overlay associated with the visible portion to edit the schema and edit the schema based on the one or more user interactions.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Implementations of the subject matter described in this disclosure may be used for operation of a wysiwyg editor, including the wysiwyg editor being configured for use in combination with an external rendering engine. A wysiwyg editor is a software editor that allows content to be edited in a form that resembles the content's appearance when printed or displayed in a finished product. For example, an HTML or XML wysiwyg editor may be used to edit HTML or XML (which may include cascading style sheets (CCS)) to generate or edit a website or other online UX. To note, the example implementations herein may be used for any suitable wysiwyg editor such that the editor is configured to work in combination with an external rendering engine. For example, the wysiwyg editor may be an HTML or XML wysiwyg editor used for generating a website or other online UXs.

A schema for UX is a representation of a plan for the UX in a form of an outline or a model. The schema is typically in some form of computer-readable text (such as in hypertext or JavaScript Object Notation (JSON)). The plan associated with the schema may also be referred to as a document representing the UX. A wysiwyg editor typically includes a sandbox in which the editor's internal rendering means are used to generate content in a visual format for testing or editing from a schema. In this manner, the editor generates a visual content within a sandbox of the editor, and a user (such as a programmer) interacts with the visual content in the editor's sandbox in order for the editor to edit the visual content. In editing the visual content, the schema may be updated. Once the visual content (and thus the schema) is finalized, the finalized schema is provided to a rendering engine to generate (also referred to as render) the final visual content to be included in the UX.

One problem with using an editor sandbox first before finalizing the schema and then rendering the final visual contents using a rendering engine is that the editor is required to include its own rendering means, which may be underpowered compared to the rendering engine itself or may include errors that change the formatting of the visual content than if the rendering engine is used to render the visual content. In addition, another problem with requiring the use of the editor's rendering means before using the rendering engine is that a visual content must be rendered at least twice before being published for use (including once by the editor and once by the rendering engine).

As described herein, to reduce the required complexity of the editor (such as not requiring its own rendering means) and to reduce the required number of times that visual content or other content is rendered before being published, a wysiwyg editor may be configured to work with a rendering engine for generating or editing a UX. In some implementations, the rendering engine renders visual content from a schema, and the wysiwyg editor generates an environment to allow a user to indicate edits to be made to the visual content (or other elements associated with the schema) so that the schema may be adjusted. In this manner, the wysiwyg editor is not required to generate the visual content for editing. In addition, once editing the schema is complete, with the rendering engine generating the updated visual content, the visual content is immediately available for publishing without requiring a new rendering be performed by the rendering engine for the final schema. Furthermore, the visual content appears during editing exactly like it will when published since only one renderer is used to generate the visual content.

Various implementations of the subject matter disclosed herein provide one or more technical solutions to the technical problem of generating or editing UXs using a wysiwyg editor. In some implementations, a computing system is configured to obtain a visible portion of a document object model (DOM) for a document, with the visible portion including one or more visible objects to be presented to a user during a UX. Instead of the visible portion being generated by the wysiwyg editor (thus requiring the visible portion to be rendered again at a later time by a rendering engine), the visible portion to be used is generated by the rendering engine based on a schema of the document. To allow such, the system generates and outputs an overlay to be placed on the visible portion during display of the visible portion, with the overlay to receive user inputs to the visible portion and thus prevent user interaction with the visible portion Various aspects of the present disclosure provide a unique computing solution to a unique computing problem that did not exist prior to the creation of UXs published for computing devices (such as laptops, desktops, smartphones, tablets, etc.). In particular, the implementations described herein provide a unique computing solution to a unique computing problem associated with editors used to edit programming code for execution in computing devices. As such, implementations of the subject matter disclosed herein are not an abstract idea such as organizing human activity or a mental process that can be performed in the human mind.

As noted above, a document may be associated with a plan for a UX (such as a website). In some implementations, a document may refer a page of a UX (such as a web page of a website). However, as used herein, a document may refer to one or a plurality of pages. A document being a web page may include an HTML or XML document (or other suitable computer readable language document) for a computer to generate a UX including the website for interaction with a user.

A document object model (DOM) is a platform independent and language independent object model and application programming interface (API) for HTML and XML documents. The DOM allows outside programs or scripts (as executed by a processor) to dynamically access and update one or more of the content, style, or structure of a document. As such, the DOM may be used to dynamically create or modify HTML documents or XML documents. As used herein, the DOM includes various components of a system that may be used to generate or edit a document. For example, a wysiwyg editor used to edit a document may be referred to as a DOM. The DOM for a document may thus include a schema generated from the document, a rendering (which may include one or more visible portions of a UX), an overlay associated with one or more visible portions as generated by the editor, and a tree structure associated with one or more visible portions as generated by the editor. As described herein, instead of a temporary rendering being generated by the editor itself, the rendering used by the editor for editing a document (which thus edits the UX) is generated by a rendering engine that is used to generate the final rendering of a final UX. To note, a schema of a document describes the structure of the document, and may be generated or obtained by the editor from processing the document. As used below, an "editor" and a "wysiwyg editor" may be used interchangeably. To note, the various examples herein refer to editing a UX, which includes editing a document used to generate the UX. In addition, generating a document or UX includes editing the UX or document by the editor.

Figure 1:
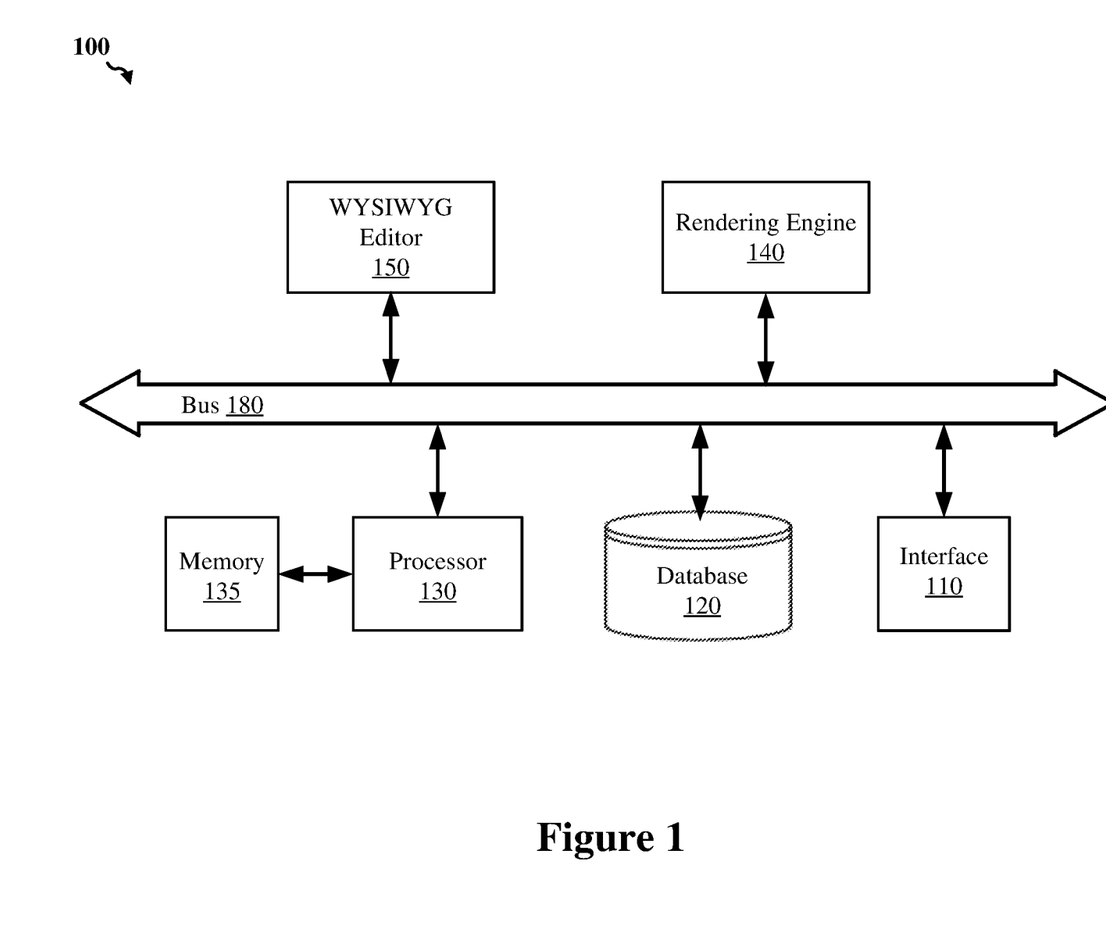
FIG. 1 shows an example system for editing a user experience (UX).

FIG. 1 shows an example system 100 for editing a UX, according to some implementations. The system 100 includes an interface 110, a database 120, a processor 130, a memory 135 coupled to the processor 130, a rendering engine 140, and a wysiwyg editor 150. As noted herein, a DOM for a document may refer to various components of the wysiwyg editor 150. In some implementations, the various components of the system 100 may be interconnected by at least a data bus 180, as depicted in the example of FIG. 1. In other implementations, the various components of the system 100 may be interconnected using other suitable signal routing resources.

The system 100 may edit a document (such as an HTML document or an XML document) using the wysiwyg editor 150 with assistance from the rendering engine 140. While the rendering engine 140 and the wysiwyg editor 150 are depicted as components separate from storage (such as a database 120 or a memory 135) to store program executable code of one or more programs and separate from a processor 130 to execute the program executable code, the rendering engine 140 and the wysiwyg editor 150 may be implemented in software to be stored and executed by the system 100 for performing various operations described herein. As such, the system 100 is an example depiction of a system used for clarity in explaining aspects of the present disclosure.

The interface 110 may be one or more input/output (I/O) interfaces to obtain a document (if not generated using a programming interface of the system 100). The interface 110 may also provide one or more visible portions of rendering from the rendering engine 140 for display, provide an overlay from the wysiwyg editor 150 for display, provide a tree structure generated by the wysiwyg editor 140 for display, provide a schema for a document for display, provide other components for display to a user, or obtain user inputs for the rendering engine 140 or the wysiwyg editor 150 to generate or edit a UX. The interface may also be used to receive or send other information associated with the operation of the system 100 (such as information associated with one or more other software programs executed by the system 100).

In some implementations, the wysiwyg editor 140 may be provided as a remote service to a user. For example, the wysiwyg editor 140 may be hosted by the system 100, and the system 100 may be remote to a user wishing to use the wysiwyg editor from his or her own device. For the system 100 being a remote system to a user, a user device may connect with the system 100 (such as via the internet) in order for the user to interact with the wysiwyg editor 150. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from user devices (such as a user's personal computer). As used herein, a "user" may refer to an individual or collection of individuals to interact with the wysiwyg editor 150 (such as a programmer or experience designer).

Alternatively, the system 100 may be local to a user. For example, the system 100 may be a personal computer of a user, with the rendering engine 140 and the wysiwyg editor 150 as software programs executed by the personal computer. For the system 100 being a local system to a user, the interface 110 may include a display (which may include a touch sensitive display), a speaker, a mouse, a keyboard, or other suitable input or output elements that allow interfacing with the user. In this manner, the system 100 may include a graphical user interface (GUI), allowing the user to see a rendering, interactive portions of the wysiwyg editor 150, and provide user input in interacting with the wysiwyg editor 150. The GUI may also be used for interacting with the final rendering after publishing the UX or portion of the UX. An example GUI is described in more detail below with reference to FIGS. 4 and 5.

The database 120 may store one or more documents, one or more schemas, outputs of the rendering engine 140, outputs of the wysiwyg editor 150, user inputs associated with the wysiwyg editor 150, or other information associated with the system 100. In some implementation, the database 120 may also store software of the rendering engine 140 or the wysiwyg editor 150 itself if the components are embodied in software. In some implementations, the database 120 may include a relational database capable of presenting information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the rendering engine 140, or the wysiwyg editor 150. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the rendering engine 140, or the wysiwyg editor 150 that may be executed by the processor 130. The memory 135 may also store outputs of the components 140 and 150, user inputs associated with the wysiwyg editor 150, or any other data for operation of the system 100. In some implementations, hardwired circuitry may be used in place of, or in combination with, software instructions to implement aspects of the disclosure. As such, implementations of the subject matter disclosed herein may not be limited to any specific combination of hardware circuitry and/or software.

The rendering engine 140 generates (renders) at least a portion of a render (also referred to as a rendering) for a UX from the schema for a document. As used herein, a visible portion of a DOM for a document may refer to at least a portion (which may include up to the entirety) of a render to be displayed for a UX for the document. In the embodiments described herein, a visible portion from the rendering engine 140 may be used by the wysiwyg editor 150 for editing a UX (including editing the associated schema and underlying document) before publishing the UX. The rendering engine 140 may include any suitable rendering engine. For example, the rendering engine may be included in a browser engine to render a visual portion to be displayed in a web browser. Specific examples of a rendering engine may include Gecko for the Mozilla® Firefox® browser and EdgeHTML for the Microsoft® Edge browser. If the rendering engine is included in a browser engine, the wysiwyg editor 150 may be configured to work with the output of the web browser associated with rendering the visible object.

The wysiwyg editor 150 edits the UX by editing the schema for a document (which may be used to edit the document itself). Editing the UX may include editing the visible portion (such as its layout, style, or contents). For a user to interact with a wysiwyg editor 150 to edit the UX (which may include editing the visible portion), the wysiwyg editor 150 is to prevent user inputs from being received (such as by a browser) for the visible portion itself. For example, a menu of a UX may be rendered by a browser engine from a schema and displayed in the browser. Typically, if a user interacts with the menu of the UX in the browser (such as clicking on different portions of the menu), the browser interprets the interactions as interacting with the menu itself, causing operations to be performed as defined in the schema. However, if a user wishes to edit the menu (or another visible portion of the render) the wysiwyg editor 150 may be configured to intercept the user inputs to the menu or visible portion so that the user is interacting with the wysiwyg editor 150 instead of the render itself. Since the wysiwyg editor 150 intercepts the user inputs, the browser does not recognize any user interactions with a menu or other visible portion as rendered by the browser engine (or other suitable rendering engine 140).

To intercept user inputs, the wysiwyg editor 150 generates an overlay to be placed on a visible portion (such as the menu) as rendered by the rendering engine 140 during display of the visible portion. The overlay may be fully transparent or semi-transparent so that the display of the overlay does not obfuscate the display of the visible portion to a user. In this manner, user inputs (such as cursor clicks, cursor hovering, display touches, keyboard inputs, and so on) may appear to be to visible objects of the visible portion (such as selecting buttons of a menu), but the user inputs are actually to regions of the overlay on the visible portion. The user inputs to the overlay may be used to edit the UX, which may include editing the schema associated with the visible portion.

For the wysiwyg editor 150 to understand user inputs to different regions of the overlay as being associated with different visible objects of a displayed visible portion, the wysiwyg editor 150 is to associate the different regions of the overlay with the different visible objects of a displayed visible portion. To be able to do so, the wysiwyg editor 150 is to have defined the structure of the visible portion to be associated with different regions of the overlay. Since documents are modeled generally in a tree structure, the wysiwyg editor 150 generates a tree structure associated with the visible portion from the schema used to generate the visible portion. The wysiwyg editor 150 also associates objects of the tree structure with visible objects of the visible portion. Based on an indication in the schema of where a visible object of a visible portion is to be displayed and the association of a visible object with a tree structure object, the tree structure object may include an indication of the location of the associated visible object. As such, the wysiwyg editor 150 is able to identify the region of the overlay that is associated with the visible object (such as the region of the overlay directly over the visible object in a GUI) based on the indicated location in the tree structure object. Operations of example implementations of a wysiwyg editor, a rendering engine, and a GUI are described in more detail herein with reference to FIGS. 2-5.

Referring back to FIG. 1, while the rendering engine 140 and the wysiwyg editor 150 are depicted as separate components from a processor 130 and memory 135 of the system 100 in FIG. 1, the components 140 and 150 may be included in software including instructions stored in memory 135 or the database 120. For example, a rendering engine 140 may be a browser engine of a web browser, and a wysiwyg editor 150 may be a software editor, which may be a separate widget of a web browser, a standalone application to work in conjunction with a web browser, or otherwise implemented in software to work with renders of a browser engine. Additionally or alternatively, one or more of the components 140 or 150 may include application specific hardware (e.g., one or more ASICs) or a combination of hardware and software to perform operations described herein. As such, the particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on.

Figure 2:
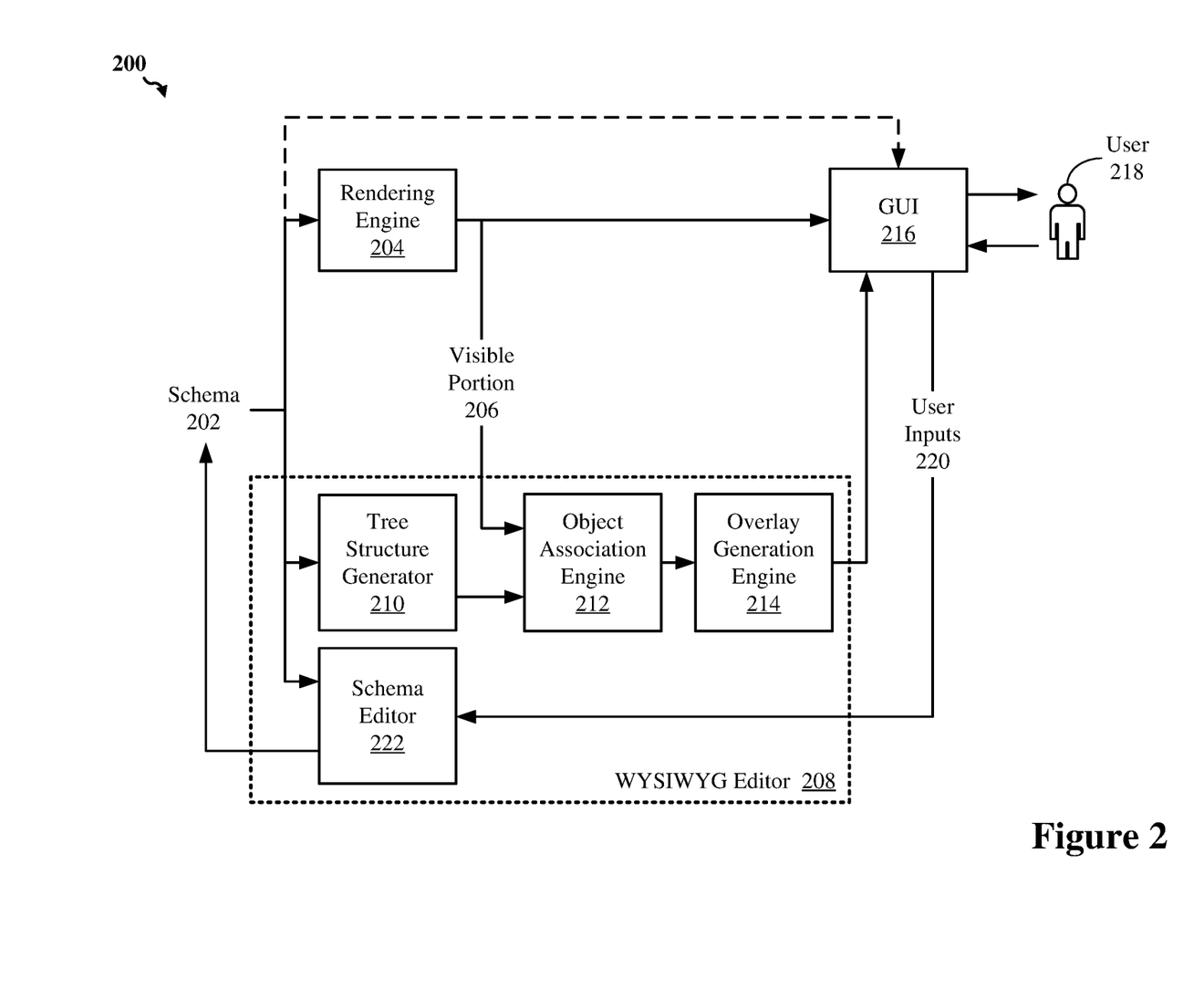
FIG. 2 shows a block diagram for editing a schema by a what you see is what you get (wysiwyg) editor.

FIG. 2 shows a block diagram 200 for editing a schema by a wysiwyg editor 208. The wysiwyg editor 208 may be an example implementation of the wysiwyg editor 150 in the system 100, and the rendering engine 204 may be an example implementation of the rendering engine 140 in the system 100. In some implementations, the GUI 216 may be part of the interface 110 in the system 100 for a local system. As such, outputs to the GUI 216 and user inputs 220 from the GUI 216 may be routed internally in the system 100 between a rendering engine 204, GUI 216, and wysiwyg editor 208. Alternatively, the GUI 216 may be part of an interface for a user device communicatively coupled to the system 100 if the system 100 is a remote system. As such, outputs to the GUI 216 and user inputs 220 from the GUI 216 may be routed via the internet or other connection means used to connect the system 100 and the user device. The user 218 may be a programmer, developer, or other suitable person for editing the UX, including editing the schema 202, which may cause the underlying document associated with the schema 202 to be edited.

As depicted in FIG. 2, a schema 202 is obtained by the wysiwyg editor 208. The schema 202 is also received by the rendering engine 204. While the schema 202 depicted as being received or separate from the wysiwyg editor 208 in FIG. 2, in some implementations, the wysiwyg editor 208 may be configured to generate the schema 202 from a document. For example, and HTML document may be provided to the schema editor 222 of the wysiwyg editor 208, and the schema editor 222 may also be configured to generate the schema 202 from the HTML document. However, the schema may be generated by any suitable component, and not necessarily the wysiwyg editor 208.

Figure 4:
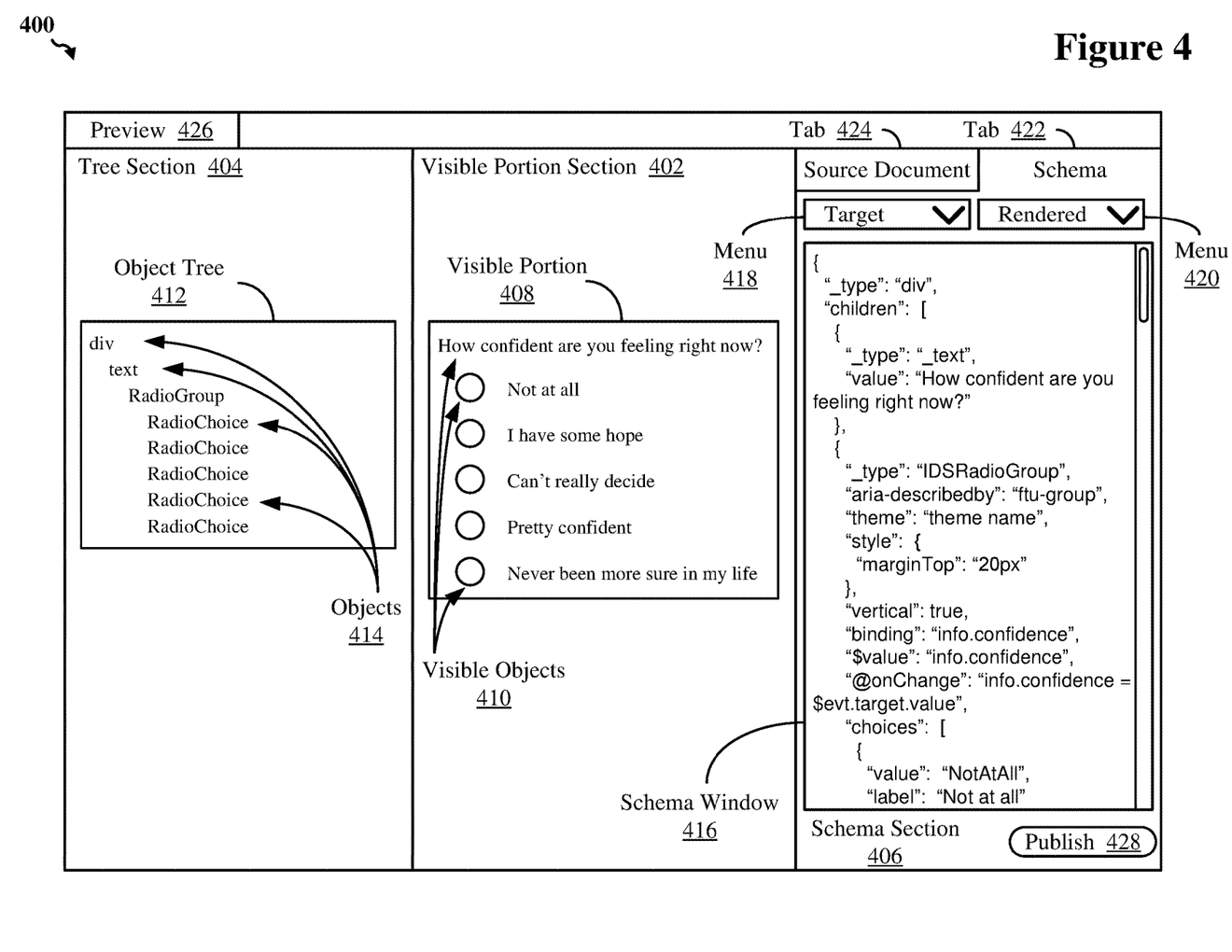
FIG. 4 shows an example graphical user interface (GUI) displaying a visible portion generated by a rendering engine, an overlay and a tree structure generated by the wysiwyg editor, and a schema associated with the visible portion and the tree structure.
Figure 5:
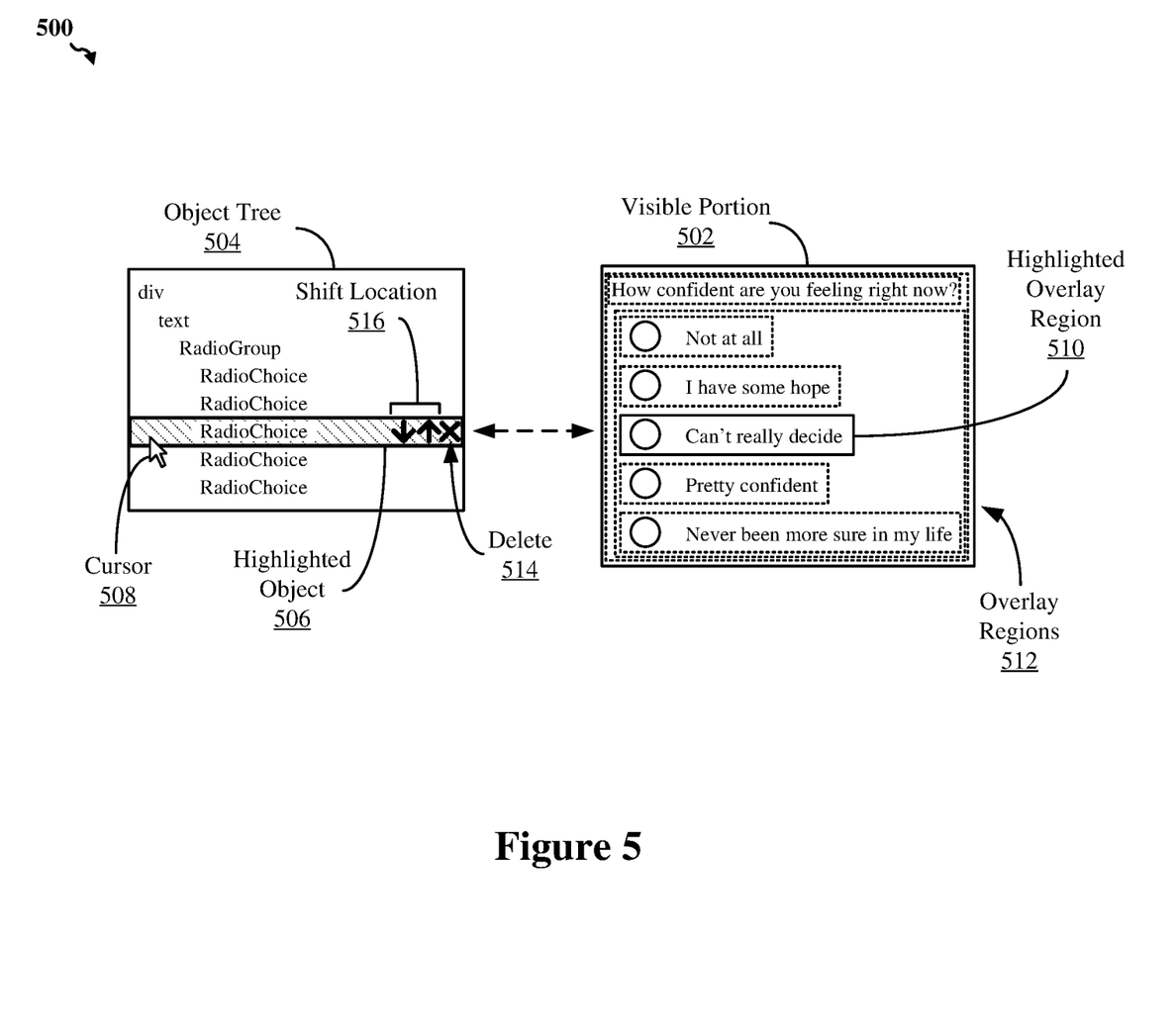
FIG. 5 shows an example GUI for highlighting linked objects of a tree structure and visible objects of a visible portion.

The rendering engine 204 generates a visible portion 206 based on the schema 202. As noted above, the visible portion 202 may include any suitable portion of the render for a UX up to the entirety of the render. In many of the examples for explaining aspects of the present disclosure, the visible portion 206 is presented as a menu of the UX (such as depicted in FIGS. 4 and 5). However, the visible portion 206 may be any visual rendering for the UX based on the schema 202.

A tree structure generator 210 of the wysiwyg editor 208 generates a tree structure from the schema 202. As depicted, generating the tree structure is independent from generating the visible portion 206. Since generating the tree structure and generating the visible portion 206 does not depend on each other, generating the tree structure and rendering the visible portion 206 may be performed concurrently, sequentially, or in any other suitable manner.

The object association engine 212 of the wysiwyg editor 208 is to link objects of the tree structure to visible objects of the visible portion 206. In referring to the visible portion 206, a visible object may be any visual object (or group of visual objects) included in a visual portion. For example, if the visible portion 206 is a menu including a plurality of choices, a visible object may be any of the choices, all of the choices together as a set, all of the text included in the menu (including a question and all of the choices associated with the question), or the totality of the menu itself. For example, referring to FIG. 5, each of the dashed boxes of the visible portion 502 (which is a menu) may indicate a visible object of the visible portion 502. In some implementations, each visible object is based on brackets indicating separate ideas in a schema. For example, referring to FIG. 4, a portion of a schema in a schema window 416 associated with the visible portion 502 in FIG. 5 depicts various brackets (or other suitable dividing text, such as commas or other punctuation) that may be used by the rendering engine to separate different visible objects of a visible portion.

Referring back to FIG. 2, the objects of a tree structure are identified to be generated by the wysiwyg editor 208 in a similar manner as the visible objects identified to be generated by the rendering engine 204 (such as based on brackets or other punctuation in the schema 202). Since objects in the tree structure may be identified in a similar manner as visible objects in the visible portion 206, each visible object of the visible portion 206 from the rendering engine 204 may map to an object of the tree structure from the tree structure generator 210. In some implementations, linking a visible object and a tree structure object may be based on the level of brackets associated with a specific tag of a tree structure object and a specific tag of an associated visible object as generated by the rendering engine 204 from the schema 202. For example, referring back to the portion of the schema in the schema window 416 in FIG. 4, the tag "div" in the top bracket may refer to an HTML div tag defining a division of one or more HTML elements from other HTML elements. As such, the div tag may indicate an object generated for the tree structure (as depicted in the object tree 412) and a visible object in the visible portion 408. In the specific example, the div tag (with the "children" tag indicating multiple elements) in the top bracket refers to the visible portion 408, which is a menu, and the top object of the tree structure generated by the wysiwyg editor. Since the top brackets and div tag indicate the entire menu, the wysiwyg editor may associate the entire menu with the div object in the tree structure generated by the wysiwyg editor (such as depicted by the object tree 412).

Similarly, a next set of brackets in the schema is associated with a "text" tag, which defines a single line of text. Since the text tag is the first child of the div tag, the text as defined by the schema appears as a visible object of text on top or otherwise first in the menu. Referring to the tree structure, the text tag being the first child means that the text appears as the next object in the tree structure (such as depicted in the object tree 412). Similarly, the "IDSRadio-Group" tag refers to a next visible object and tree structure object, which is to define a group of radio buttons for a set of related options in the menu. As such, all of the radio choices together may be considered a single visible object and a single tree structure object for the radio group tag. Additionally, each of the radio choices associated with a "choice" tag or "radiochoice" tag (also referred to as a radio choice tag) in lower layer brackets in the schema may be associated with a visible object and associated tree structure object (such as the visible portion 408, which is a menu, including five separate visible objects and the tree structure depicted by the object tree 412 including five separate visible objects associated with the five separate choices for the radio group tag as defined in the schema.

Referring back to FIG. 2, the overlay generation engine 214 of the wysiwyg editor 208 generates an overlay associated with the visible portion 206 generated by the rendering engine 204, the tree structure generated by the tree structure generator 210, and the links between objects of the tree structure (which may be referred to simply as "objects") and visible objects in the visible portion 206 as generated by the object association engine 212. As noted herein, the overlay is placed on the visible portion 206 during display of the visible portion 206 in the GUI 216, and the overlay is used to receive user inputs 220 and prevent user interactions with the visible portion 206. For example, referring back to FIG. 4, if a user uses a cursor to click on a visible object of the menu, the overlay prevents the cursor click from being received at the menu for interacting with the menu. Instead, the overlay receives the cursor click for editing or otherwise manipulating the UX (such as to edit the schema).

In order to accurately identify the portion of the schema for editing based on a location of a user input (such as a cursor click over a specific visible object of the visible portion), the wysiwyg editor is to associate different regions of the overlay in the GUI with the corresponding locations of the visible objects in the GUI. To do such, the overlay generation engine 214 of the wysiwyg editor 208 identifies locations of the visible objects of the visible portion in the GUI based on the tree structure. The rendering engine 204 generates the visible portion 206 (including the locations of the visible objects) based on the schema 202. In particular, the schema 202 may indicate a formatting of the visible objects in order to generate the visible objects in specific locations of a GUI. For example, referring back to FIG. 4 the portion of the schema in the schema window 416 includes a "marginTop" command for "style" of "20px", indicating that the group of radio choices associated with the radio group tag are to begin 20 pixels below the top of the menu. The schema also indicates that the radio choices are to be displayed vertically (with the "vertical" command equal to true). In addition, the theme for the radio group (generically called "theme name" in the schema to define the theme of predefined parameters) may indicate further formatting for the radio group. Such formatting information may also be identified by the wysiwyg editor (such as when linking objects of the tree structure to visible objects) when processing the schema. As such, based on the formatting information provided by the schema for a visible object, the linked tree structure object may include an indication of the location of the visible object in the GUI.

In some implementations, the wysiwyg editor uses a span tag for specific text in the visible portion to associate with an object of the tree structure and a portion of \the schema indicating the text associated with the visible portion. For example, the span tag is generated to include an identification (ID) in the span tag for a visible object corresponding to an ID in the schema portion used for generating the visible object. The corresponding tree structure object may also include the same ID based on being generated based on the same portion of the schema including the ID. As such, the ID from the span tag in the visible portion may be matched with the ID from a tree structure object and the ID from a schema portion to show the corresponding objects. In this manner, the span tag in the visible portion may be used to indicate the location of the visible portion. Additionally or alternatively, a div tag may be used to identify the location of one or more visible portions based on a default rendering format associated with the div tag (or style commands included with the div tag in the schema if different from the default formatting). Similarly, if the rendering engine is associated with a default formatting for rendering various objects based on the tag and its location in the schema, such default formatting may be defined for the wysiwyg editor such that the wysiwyg editor is able to indicate default locations in the various tree structure objects.

Referring back to FIG. 2, with the overlay generation engine 214 of the wysiwyg editor 208 generating the overlay (with the various locations of the overlay associated with various visible objects), the overlay may be provided to the GUI 216 for display. As noted above, the overlay is placed on the visible portion during display on the GUI to receive user inputs 220 via the GUI to the visible portion 206 and prevent user interaction via the GUI 216 with the visible portion 206 (thus intercepting user inputs on locations of the visible portion such that the user 218 is not interacting with the visible portion 206 but with the overlay).

Some user inputs 220 may be used to update the schema 202. For example, one or more user inputs 220 may indicate that the radio choice buttons of a menu are to be in a different order (such as by a user touching a display or using a cursor to drag a radio choice into a different location). Such user inputs 220 are received by the wysiwyg editor 208 and translated into how the visible portion 206 (or other portions of the UX) are to be edited. For example, the schema editor 222 may receive the user inputs 220, identify from the user input 220 adjustments to be made the UX, and edit the schema 202 based on the identified adjustments. In some implementations, the edited schema may be provided to the rendering engine 204 to update the visible portion (such as to generate a new render), and the edited schema may be provided to the tree structure generator 210 to update the tree structure (such as to generate a new tree structure) associated with the updated visible portion. In some implementations, the above described process of updating the schema 202 may be performed iteratively until the schema 202 is in a final form for a UX.

While not depicted in FIG. 2, a system (such as the wysiwyg editor 150 of the system 100 or another suitable programming component of the system 100) may update the underlying document based on the changes to the schema. However, while some examples are provided herein for editing the schema and the associated document, the schema and associated document may be edited in any suitable manner based on the user inputs.

In some implementations, with the visible portion 206 and the overlay being display concurrently on the GUI 216, the GUI 216 may also display the tree structure generated by the wysiwyg editor 208. As such, the wysiwyg editor 208 may provide the tree structure of objects linked to the visible objects of the visible portion 206 for display with the visible portion and the overlay on the GUI 216. An example of the tree structure being concurrently displayed with the visible portion on a GUI is depicted in FIGS. 4 and 5. In some further implementations, the schema 202 may also be displayed concurrently with the visible portion 206 and the overlay (and optionally the tree structure). FIG. 4 depicts an example of the schema being displayed concurrently with the visible portion, the tree structure, and the overlay.

To note, the wysiwyg editor 208 is depicted in a simplified manner to include components used to describe aspects of the present disclosure. For example, the schema 202 is depicted as being provided directly to the GUI 216. However, the wysiwyg editor 208 may provide the schema to the GUI 216 for display. In another example, the GUI may be included in the wysiwyg editor 208 as a specific user interface for a user to edit the UX. As such, the GUI 216 may be provided by the wysiwyg editor 208 for display on a display. In all embodiments, though, the rendering engine 204 is separate from the wysiwyg editor 208.

In some implementations, the wysiwyg editor 208 includes other components not depicted in FIG. 2 to provide a plurality of tools to assist a user with editing the UX. For example, the wysiwyg editor 208 may be configured that, if a user input highlights an object in the tree structure displayed on the GUI 216, the wysiwyg editor 208 may provide instructions to the GUI 216 to highlight the region of the overlay placed on the visible portion linked to the highlighted object. Conversely, if a user 218 provides a user input to an overlay region associated with a visible object, the wysiwyg editor 208 may be configured to provide instructions to the GUI 216 to highlight the selected overlay region associated with the visible portion and the tree structure object linked to the associated visible portion. For example, if span tags in the visible objects are used to indicate the locations of visible objects in the GUI with same IDs as tree structure objects, highlighting a region of the overlay may be based on a span tag of the visible object associated with the linked tree structure object. As such, the GUI 216 may appear to a user 218 to be highlighting both the linked tree structure object and visible object. An example of highlighting a location of the overlay and a tree structure object is depicted in FIG. 5.

Figure 3:
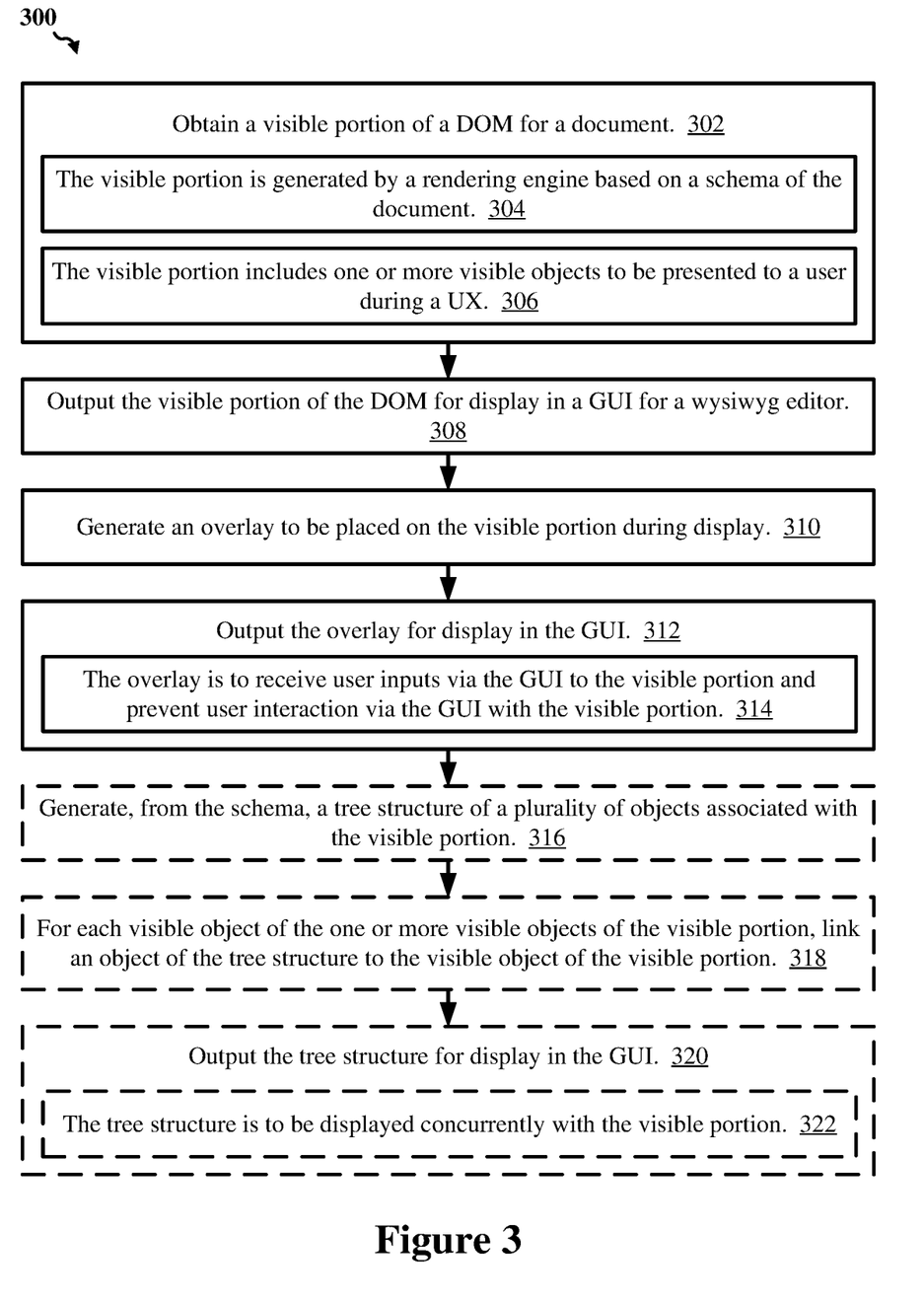
FIG. 3 shows an illustrative flow chart depicting an example operation for editing a UX.

FIG. 3 shows an illustrative flow chart depicting an example operation 300 for editing a UX. The operation 300 is described as being performed by the system 100 (such as by the wysiwyg editor 150 and/or other suitable components of the system 100) for clarity in explaining aspects of the present disclosure. For example, if the wysiwyg editor 150 is embodied in software, the processor 130 may execute the software in order to perform the operations described with reference to FIG. 3.

At 302, the system 100 obtains a visible portion of a DOM for a document. The visible portion is generated by a rendering engine based on a schema of the document (304). As noted above, the visible portion may be any suitable portion of a render, which may be up to the entirety of the render. For example, a visible portion may include a menu, such as described in the examples herein and depicted in FIGS. 4 and 5. The visible portion includes one or more visible objects to be presented to a user during a UX (306). For example, in FIG. 5, the visible portion 502 (a menu) includes a visible object for the entirety of the menu associated with a div tag in the schema, a visible object of the top text line associated with a text tag in the schema, a visible object of the entire group of radio choices associated with a radio group tag in the schema, and a plurality of visible objects of the plurality of radio choices associated with a radio choice tag in the schema. The various visible objects of the visible portion 502 can be conceptually visualized based on the dashed boxes around the various portions of the menu (which are overlay regions 512 of an overlay) as depicted in FIG. 5. At 308, the system 100 outputs the visible portion of the DOM for display in a GUI for the wysiwyg editor 150.

At 310, the wysiwyg editor 150 of the system 100 generates an overlay to be placed on the visible portion during display. At 312, the system 100 outputs the overlay for display in the GUI. As noted herein, the overlay is to receive user input via the GUI to the visible portion and prevent user interaction with the visible portion (314). As such, the overlay intercepts the user inputs in order to be used to edit the UX instead of interacting with the visible portion of the render.

In some implementations, at 316, the wysiwyg editor 150 of the system 100 also generates, from the schema, a tree structure of a plurality of objects associated with the visible portion. At 318, the wysiwyg editor 150 of the system 100 may also link, for each visible object of the one or more visible objects of the visible portion, an object of the tree structure to the visible object of the visible portion. For example, one or more of brackets or tags in the schema may be used to identify which visible object corresponds to which tree structure object. At 320, the system 100 may output the tree structure generated by the wysiwyg editor 150 for display in the GUI. The tree structure output for display may be displayed concurrently with the visible portion (322).

FIG. 4 shows an example GUI 400 displaying a visible portion 408 generated by a rendering engine, an overlay (which may be transparent) and a tree structure (depicted in the object tree 412) generated by the wysiwyg editor, and a schema (depicted in the schema window 416) associated with the visible portion 408 and the tree structure. The GUI 400 has the various components displayed in a manner such that the display is visually divided into three sections: a visible portion section 402 to display the visible portion 408; a tree section 404 to display an object tree 412 including the tree structure generated by the wysiwyg editor; and a schema section 406 to display an associated schema in a schema window 416. While the GUI 400 depicts the visible portion, the tree structure, and the schema being concurrently displayed, in some implementations, only the visible portion or the visible portion and one of the tree structure of the schema may be displayed. For example, the GUI may display only a visible portion, an overlay, and any tools of the wysiwyg editor to assist a user in editing the UX.

Referring to the visible portion section 402, the visible portion 408 includes various visible objects 410. To note, only a few and not all visible objects of the visible portion 408 are identified. In the example, the visible portion 408 is a menu asking for a user to indicate his or her confidence in a task.

Referring to the tree section 404, the tree structure of the object tree 412 includes various tree structure objects 414. To note, only a few and not all objects in the object tree 412 are identified. The tree structure in the object tree 412 corresponds to the visible portion 408. For example, the "div" object corresponds to the entire visible portion 408, the "text" object corresponds to the top line of text "How confident are you feeling right now?" visible object in the visible portion 408, the "RadioGroup" object (also referred to as a radio group object) corresponds to the group of radio choices as a visible object in the visible portion 408, and each "RadioChoice" object in order corresponds to the radio choice visible objects in order in the visible portion 408.

Referring to the schema section 406, the schema window 416 may display all or a portion of the schema used to generate the visible portion 408 and the tree structure in the object tree 412. For example, as shown, the schema window 416 may include a slider to scroll to other portions of the schema not displayed in the schema window 416. In some implementations, the schema section 406 may include different tabs 422 and 424 to see different information. For example, schema tab 422 (as depicted) may provide the schema window 416 to view the schema. The schema tab 422 may also include menus 418 and 420. Menu 418 may be a drop down menu to select a target product or software to be associated with the UX. Menu 420 may be a drop down menu to select a visible portion of the render to be displayed (so as to allow jumping to different portions of a render for editing). The source document tab 424 may display the source document used to generate the schema. In some implementations, a user may edit the schema or the source document directly by selecting and typing into different portions of the schema or different portions of the document.

In some implementations, the schema section 406 (or another suitable area of the GUI 400) may include a publish button 428 to publish the UX once no more edits are to be made. For example, once the visible portion 408 is in a format acceptable to a user, the publish button 428 may be selected to set the UX with rendering to use by others. As such, the overlay and other parts of the wysiwyg editor in the GUI 400 may be removed so that the visible portion or other parts of the render and the UX in general may be interacted with by a user. To note, if a browser engine renders the visible portion and other parts of the render, the GUI 400 may be presented in or with a browser displaying the render. Once published, only the browser displaying the render of the UX would remain (with the tree section 404, schema section 406, and other aspects associated with the wysiwyg editor being removed from the display).

In some implementations, the GUI 400 may include a preview button 426 for the UX to be previewed in totality. For example, the overlay may be temporarily disabled to allow the user to interact with the visible portion 408. Additionally or alternatively, if the render includes more than the visible portion 408, other parts of the render may be displayed during the preview.

In some implementations, if a tree structure object 414 or a visible object 410 is selected (which is actually a region of the overlay on top of the visible object being selected), the linked tree structure object 414 and visible object 410 associated with the selection may appear to be highlighted in the GUI 400. In particular, the tree structure object and a region of the overlay associated with the linked visible object are highlighted in the GUI 400. In this manner, a user may be made aware of which tree structure object is linked to which visible object.

FIG. 5 shows an example GUI 500 for highlighting linked objects of a tree structure and visible objects of a visible portion 502. The GUI 500 is an example implementation of a portion of the GUI 400 in FIG. 4. As such, the object tree 504 may be the object tree 412, and the visible portion 502 may be the visible portion 408. The overlay is a transparent layer on top of the visible portion 502. The dashed boxes in the visible portion 502 depict the overlay regions 512 that are associated with the different visible objects of the visible portion 502.

As noted above, an overlay may include a plurality of regions (which may also be referred to as overlay objects). For each visible object displayed, a region of the overlay on top of the visible object is associated with the visible object and the linked tree structure object. As such, generating the overlay may include identifying locations of the visible objects of the visible portion in the GUI based on the tree structure. Generating the overlay may thus include generating regions of the overlay associated with the visible objects and coinciding with the locations of the visible objects. In some implementations, the overlay regions are based on bounding boxes including the portions of the overlay on top of the visible portions. If bounding boxes are used to indicate different regions of the overlay, the regions may be defined by a starting location of a bounding box (such as a top-left pixel of the bounding box) and a length and width of the bounding box (such as the number of pixels wide and the number of pixels high of the bounding box). In some implementations, a span tag in a visible object may indicate the size and location of the bounding box to indicate the region of the overlay on top of the linked visible object. In some implementations of linking an object in a tree structure to a visible object, the wysiwyg editor inserts a span tag into a machine language code of the visible portion associated with the tree structure object to indicate the region of the overlay (such as the location and size of the bounding box defining the overlay region) corresponding to the visual object. As noted above, the span tag information may be based on formatting information from the schema or being otherwise defined (such as based on a default formatting).

In some implementations, identifying the locations of the visible objects of the visible portion for generating the regions of the overlay is in a sequential manner. For example, the wysiwyg editor may begin at the top object of the tree structure and go down object by object to identify an overlay region on top of the visible portion linked to the specific tree structure object. As noted above, a span tag included in the visible object may be used to indicate the location of the visible object in the GUI, and the ID in the span tag may indicate an ID of a tree structure object associated with the visible object. If span tags are included in the visible objects to indicate the locations of bounding boxes to be used to identify the overlay regions, the wysiwyg editor may use the location and dimensions identified by a span tag to generate the region of the overlay on top of the linked visible object associated with the tree structure object having the same ID. The regions of the overlay may be generated in a step wise manner from the top tree structure object to the bottom tree structure object. To note, and as depicted in FIG. 5, a tree structure object may be a branch within another tree structure object (such as each radio choice object being a branch of the radio group object). As such, the overlay region associated with the branch object in the tree structure may be within the overlay region associated with the higher tree structure object. For example, each overlay region 512 associated with each radio choice object is within the overlay region 512 associated with the radio group object.

With the overlay regions generated for the various visible objects, the collection of all overlay regions makeup the overlay on top of the visible portion. To note, if the visible portion changes, the overlay regions may change (such as based on changes to the span tags in the visible objects). As such, changes to the overlay based on changes to the visible portion, especially if the overlay is transparent, may be seamless to a user.

As noted herein, for editing the UX, the system 100 may receive one or more user interactions via the GUI to the overlay associated with the visible portion in order to edit the schema, and the system 100 may edit the schema based on the one or more user interactions. For example, referring back to FIG. 5, a user may use the cursor 508 to click and hold on one of the radio choices in the visible portion 502 and attempt to drag the radio choice to a different location in the list. Alternatively, the user may use the cursor 508 to attempt to drag a radio choice tree structure object in the object tree 504 to a different location in the object tree. The system 100 interprets such a user input as a request to reorder the radio choices. As such, based on the user input, the wysiwyg editor 150 may edit the schema to reorder the radio choices. For example, the wysiwyg editor 150 may identify which overlay region is selected and how far the overlay region is dragged in relation to the locations of other overlay regions to determine a new location for the overlay region (and thus the new location of the associated tree structure object in the tree structure and the linked visible object in the visible portion). The wysiwyg editor 150 may then use such information to update the schema to reorder the radio choices. In another example, a user may use the cursor 508 to double click on a section of the text in the visible portion 502 to indicate that the text of a visible object is to be modified. The system 100 may instruct the GUI to highlight the text in the schema for the visible object associated with the cursor click. For example, the wysiwyg editor 150 may identify which overlay region is double clicked. Based on the tree structure object associated with the overlay region, the wysiwyg editor 150 identifies the portion of the schema used to generate the tree structure object. A "label" command or "text" command may be used by the wysiwyg editor 150 to identify and highlight the specific text in the schema portion to be amended, and the user may edit the schema at the identified location to edit the text. Alternatively, a pop-up window or another means may be used to indicate the text identified from the schema that is to be edited, and a user may update the language within the window or other means (with the wysiwyg editor 150 updating the schema based on the user changes to the text indicated). With the schema edited by the wysiwyg editor 150, the edited schema may thus be used by the system 100 to update the underlying document.

Referring back to FIG. 5, FIG. 5 shows the example GUI 500 including a highlighted object 506 of the tree structure and a highlighted overlay region 510 on top of the visible portion linked to the highlighted object 506 (with the link depicted as the dashed line between the visible object and the tree structure object). In some implementations, the system 100 receives a user selection via a GUI of one of an area of the overlay corresponding to the visible object or a linked object of the tree structure. For example, in FIG. 5, the cursor 508 may have been used to select the radio choice object that is highlighted. Selecting the tree structure object may include clicking anywhere in the highlighted area of the highlighted object 506. Alternatively, the cursor 508 may have been used to select an overlay region on top of a visible object. For example, the cursor 508 may have been used to click anywhere inside the bounding box defining a specific overlay region on top of a specific visible object. In some implementations, if multiple overlay regions exist at the same location in the GUI, a second click or multiple clicks may be used to rotate or otherwise switch between the different overlay regions (and thus the different visible objects). For example, the overlay regions 512 are all of the overlay regions associated with the menu, with the dashed boxes indicating the bounding boxes defining the size and locations of the overlay regions. To note, the dashed boxes may not be shown on the GUI. Instead, the dashed boxes are depicted in FIG. 5 exclusively for clarity in depicting different regions of the transparent overlay. The highlighted overlay region 510 for a radio choice of the menu is included in the overlay region for the radio group of the menu, which is included in the largest overlay region on top of the entire menu. A user may use the cursor 508 to cycle through which of overlay regions 512 (and thus which visible object) associated with the cursor location is of interest or to be edited.

Based on the user selection of an area of the overlay corresponding to a visible object (such as a specific overlay region) or a linked object of the tree structure, the system 100 (such as via the GUI) highlights a region of the overlay associated with the area of the overlay corresponding to the visible object based on the user selection and highlights the linked object in the tree structure associated with the visible object. For example, as shown in FIG. 5, the system 100 may use the user selection from cursor 508 to highlight the highlighted object 506 in the GUI 500. Highlighting the tree structure object may take any form, such as bolding the tree structure object name, underlying the tree structure object name, highlighting an area of the object tree 504 associated with the tree structure object, and so on. The system 100 also highlights in the GUI 500 the highlighted overlay region 510 on top of the linked visible object. Highlighting an overlay region may take any form, such as displaying the bounding box around the overlay region (such as depicted in FIG. 5), making the overlay region less transparent, and so on. In some implementations, if span tags are used to link tree structure objects to visible objects to indicate the locations of the regions of the overlay on top of the visible objects, highlighting the region of the overlay may be based on the span tag of the visible object attempting to be selected by the user (or the linked tree structure object being selected by the user). While the example GUI 500 in FIG. 5 depicts the tree structure object being selected, conversely, the overlay region on top of the visible object of the visible portion 502 may be selected. With the GUI having the overlay region on top of a visible object and the corresponding tree structure object highlighted, the user may be able to identify the different visible objects of the visible portion associated with the different tree structure objects of a displayed tree structure.

The GUI 500 also depicts some example tools that may be provided by the wysiwyg editor for editing the schema. For example, once the radio choice tree structure object is highlighted (shown as highlighted object 506), the GUI 500 may display a delete button 514 and shift location buttons 516. The delete button 514 may be used to delete the radio choice from the menu. For example, if the user uses the cursor 508 to select the delete button 514, the wysiwyg editor edits the schema to delete the radio choice element from the radio group based on the selection of the delete button 514. With the schema updated, the wysiwyg editor may update the tree structure (such as by generating a new tree structure based on the updated schema) to remove the radio choice tree structure object, and the rendering engine may update the visible portion (such as by generating a new visible portion based on the updated schema, to remove the radio choice from the visible portion. The shift location buttons 516 may be used to shift the location of the tree structure object to a different location in the tree structure. For example, pressing the up button may indicate that the selected radio choice is to be above the radio choice directly above the selected radio choice. Pressing the down button may indicate that the selected radio choice is to be below the radio choice directly below the selected radio choice. The wysiwyg editor may edit the schema based on whether the tree structure object is to be shifted up or down, and the wysiwyg editor may adjust the tree structure based on the edited schema. The rendering engine may also adjust the visible portion based on the edited schema. As noted above, the system 100 may update the underlying document based on the edited schema. To note, while some example tools of the wysiwyg editor are depicted, any suitable number and type of tools may be depicted in a GUI or otherwise used for editing the schema and thus the UX.

As described above, the system 100 (or another suitable system) including a wysiwyg editor may edit a UX (including editing a schema) based on a visible portion rendered by a rendering engine instead of a temporary render by the editor itself. As noted above, for the wysiwyg editor to use the render from a rendering engine for editing purposes, the wysiwyg editor generates an overlay to receive user input and thus prevent user interaction with the render. The user inputs are used to adjust the schema, which may be used to update the underlying document and may be used by the rendering engine to update the render of the UX. As such, the wysiwyg editor is not required to have its own rendering means, thus reducing the complexity of the editor and preventing any errors that may occur in differences between renders by the editor and renders by the rendering engine. In addition, a render is not required to be generated temporarily for editing by the wysiwyg editor and then again by the rendering engine when editing is complete, which may reduce time and processing resources required to finalize the UX for use. Furthermore, the editor's experience is greatly improved by seeing one consistent render that is the same during editing and during publishing and allowing the editor to appear to interact with the visible portion for editing instead of actually with the visible portion during use.

While the examples herein are described with reference to system 100, any suitable system may be used to perform the operations described herein. In addition, as used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. For example, referring back to FIG. 3, while blocks 316 and 318 are depicted as being performed after blocks 310 and 312, blocks 316 and 318 may be performed before blocks 310 and 312. In particular, generating an overlay in block 310 may be based on the tree structure generated and linked to the visible portion in blocks 316 and 318. In addition, or to the alternative, of the order of operations being in any suitable order or operations being performed concurrently, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for editing a user experience by a what you see is what you get (wysiwyg) editor, the method comprising:
    obtaining a visible portion of a document object model (DOM) for a document, wherein:
        the visible portion is generated by a rendering engine based on a schema of the document; and
        the visible portion includes one or more visible objects to be presented to a user during a user experience;
    outputting the visible portion of the DOM for display in a graphical user interface (GUI) for the wysiwyg editor;
    generating, from the schema, a tree structure of a plurality of objects associated with the visible portion;
    for each visible object of the one or more visible objects of the visible portion, linking an object of the tree structure to the visible object of the visible portion;
    outputting the tree structure for display in the GUI, wherein the tree structure is to be displayed concurrently with the visible portion;
    generating an overlay to be placed on the visible portion during display, wherein generating the overlay includes:
        identifying locations of the visible objects of the visible portion in the GUI in a sequential manner based on the tree structure; and
        generating regions of the overlay associated with the visible objects and coinciding with the locations of the visible objects;
    outputting the overlay for display in the GUI, wherein the overlay is to receive user inputs via the GUI to the visible portion and prevent user interaction via the GUI with the visible portion;
    receiving a user selection via the GUI of one of an area of the overlay corresponding to a visible object or a linked object of the tree structure;
    highlighting a region of the overlay associated with the area of the overlay corresponding to the visible object based on the user selection;
    highlighting the linked object in the tree structure associated with the visible object based on the user selection; and
    outputting the schema for display, wherein the schema is displayed concurrently with the tree structure and the visible portion.

2. The method of claim 1, wherein linking the object in the tree structure to the visible object includes inserting a span tag into a machine language code of the visible object to indicate the region of the overlay corresponding to the visible object.

3. The method of claim 2, wherein highlighting the region of the overlay is based on the span tag associated with the linked object in the tree structure.

4. The method of claim 1, further comprising:
    receiving one or more user interactions via the GUI to the overlay associated with the visible portion to edit the schema; and
    editing the schema based on the one or more user interactions.

5. A system for editing a user experience by a what you see is what you get (wysiwyg) editor, the system comprising:
    one or more processors; and
    a memory storing instructions that, when executed by the one or more processors, causes the system to perform operations comprising:
        obtaining a visible portion of a document object model (DOM) for a document, wherein:

the visible portion is generated by a rendering engine based on a schema of the document; and the visible portion includes one or more visible objects to be presented to a user during a user experience;

outputting the visible portion of the DOM for display in a graphical user interface (GUI) for the wysiwyg editor;

generating, from the schema, a tree structure of a plurality of objects associated with the visible portion;

for each visible object of the one or more visible objects of the visible portion, linking an object of the tree structure to the visible object of the visible portion;

outputting the tree structure for display in the GUI, wherein the tree structure is to be displayed concurrently with the visible portion;

generating an overlay to be placed on the visible portion during display, wherein generating the overlay includes:

identifying locations of the visible objects of the visible portion in the GUI in a sequential manner based on the tree structure; and generating regions of the overlay associated with the visible objects and coinciding with the locations of the visible objects;

outputting the overlay for display in the GUI, wherein the overlay is to receive user inputs via the GUI to the visible portion and prevent user interaction via the GUI with the visible portion;

receiving a user selection via the GUI of one of an area of the overlay corresponding to a visible object or a linked object of the tree structure;

highlighting a region of the overlay associated with the area of the overlay corresponding to the visible object based on the user selection;

highlighting the linked object in the tree structure associated with the visible object based on the user selection; and outputting the schema for display, wherein the schema is displayed concurrently with the tree structure and the visible portion.

6. The system of claim 5, wherein linking the object in the tree structure to the visible object includes inserting a span tag into a machine language code of the visible object to indicate the region of the overlay corresponding to the visible object.

7. The system of claim 6, wherein highlighting the region of the overlay is based on the span tag associated with the linked object in the tree structure.

8. The system of claim 5, wherein the operations further comprise:

receiving one or more user interactions via the GUI to the overlay associated with the visible portion to edit the schema; and editing the schema based on the one or more user interactions.

* * * * *